(12) United States Patent
Bao et al.

(10) Patent No.: US 9,433,063 B2
(45) Date of Patent: Aug. 30, 2016

(54) INTELLIGENT ILLUMINATION CONTROL METHOD, APPARATUS, AND SYSTEM

(71) Applicants: Xinping Bao, Beijing (CN); Guanglei Zhang, Beijing (CN); Jichuan Zheng, Beijing (CN)

(72) Inventors: Xinping Bao, Beijing (CN); Guanglei Zhang, Beijing (CN); Jichuan Zheng, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 86 days.

(21) Appl. No.: 14/257,101

(22) Filed: Apr. 21, 2014

(65) Prior Publication Data

US 2014/0333209 A1    Nov. 13, 2014

(30) Foreign Application Priority Data

May 8, 2013   (CN) .......................... 2013 1 0166139

(51) Int. Cl.
*H05B 37/02* (2006.01)

(52) U.S. Cl.
CPC ...... *H05B 37/0227* (2013.01); *H05B 37/0218* (2013.01); *Y02B 20/46* (2013.01); *Y02B 20/48* (2013.01)

(58) Field of Classification Search
CPC ....................... H05B 37/0218; H05B 37/0272
USPC ................................................. 315/149–155
See application file for complete search history.

(56) References Cited

U.S. PATENT DOCUMENTS

| | | | |
|---|---|---|---|
| 8,183,785 B2 | 5/2012 | Boleko Ribas et al. | |
| 2007/0103007 A1 | 5/2007 | Miki | |
| 2010/0235309 A1* | 9/2010 | Boleko Ribas | H05B 33/0863 706/13 |
| 2012/0319596 A1* | 12/2012 | Nanahara | H05B 37/0227 315/153 |
| 2012/0326611 A1* | 12/2012 | Nanahara | H05B 37/0227 315/151 |
| 2013/0134886 A1* | 5/2013 | Golding | H05B 37/00 315/152 |
| 2013/0141011 A1* | 6/2013 | Fushimi | H05B 37/02 315/294 |
| 2013/0307419 A1* | 11/2013 | Simonian | H05B 33/0869 315/153 |

FOREIGN PATENT DOCUMENTS

JP    2009-238529    10/2009

OTHER PUBLICATIONS

Tanaka, et al., "An Evolutionary Optimization Algorithm to Provide Individual Illuminance in Workplaces." SMC 2009, IEEE, 2009.
Keyser, et al., "Modelling, Identification and Simulation of a Lighting Control System," The Annals of "Dunarea De Jos" University of Galati, Fascicle III, pp. 115-120, 2002.

* cited by examiner

*Primary Examiner* — Jason M Crawford
(74) *Attorney, Agent, or Firm* — Cooper & Dunham LLP

(57) ABSTRACT

Disclosed are an intelligent illumination control method, apparatus, and system. The method includes a step of obtaining at least one image of a predetermined lighting area captured by at least one stereo camera; a step of determining, based on the at least one image, one or more target illuminance values of the predetermined lighting area; and a step of determining, based on the one or more target illuminance values, a dimming level of at least one illumination apparatus so that the at least one illumination apparatus works according to the determined dimming level.

9 Claims, 6 Drawing Sheets

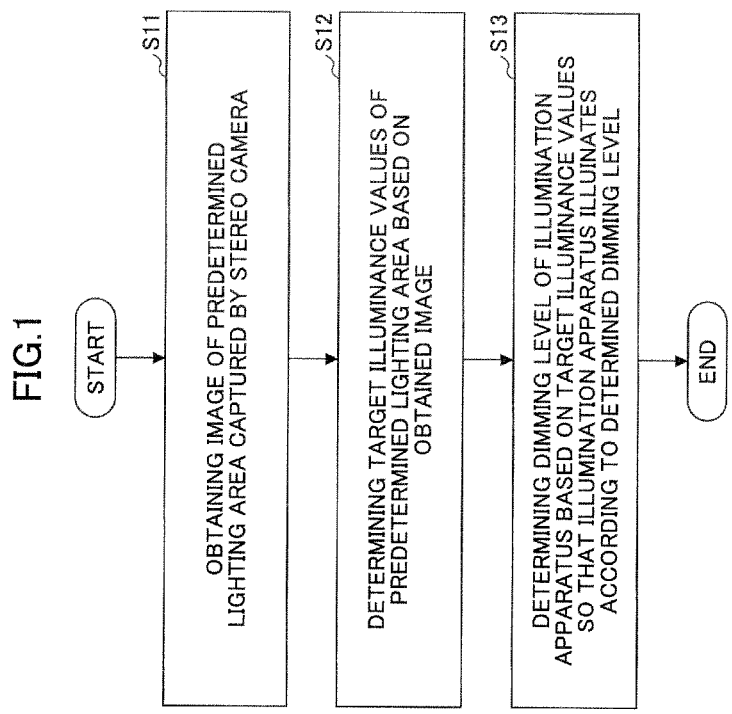

FIG.2A

| CELL | $D^1_1$ | $D^2_1$ | ... | $D^k_1$ |
|---|---|---|---|---|
| R1 | A11 | A12 | ... | A1k |
| R2 | A21 | A22 | ... | A2k |
| ... | ... | ... | ... | ... |
| RN | $A_{N1}$ | $A_{N2}$ | ... | $A_{Nk}$ |

ILLUMINATION APPARATUS 1 — DIMMING LEVEL

ILLUMINATION APPARATUS 2

...

ILLUMINATION APPARATUS M

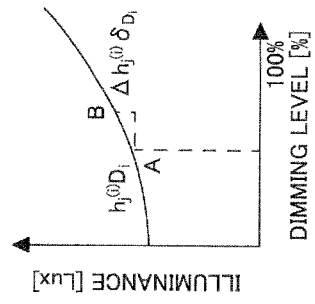
FIG.2D
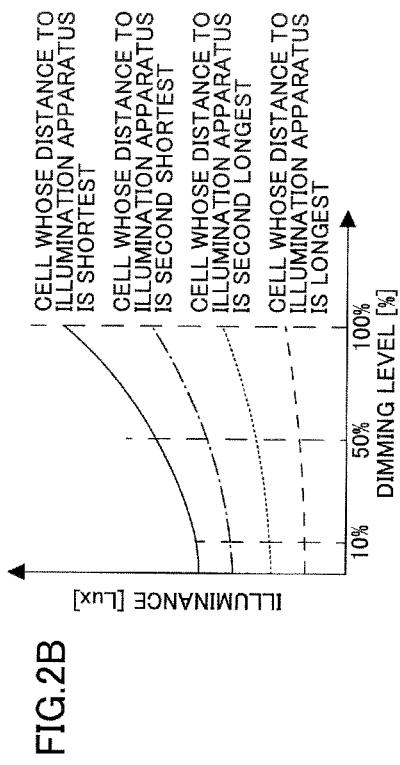
FIG.2B
FIG.2C

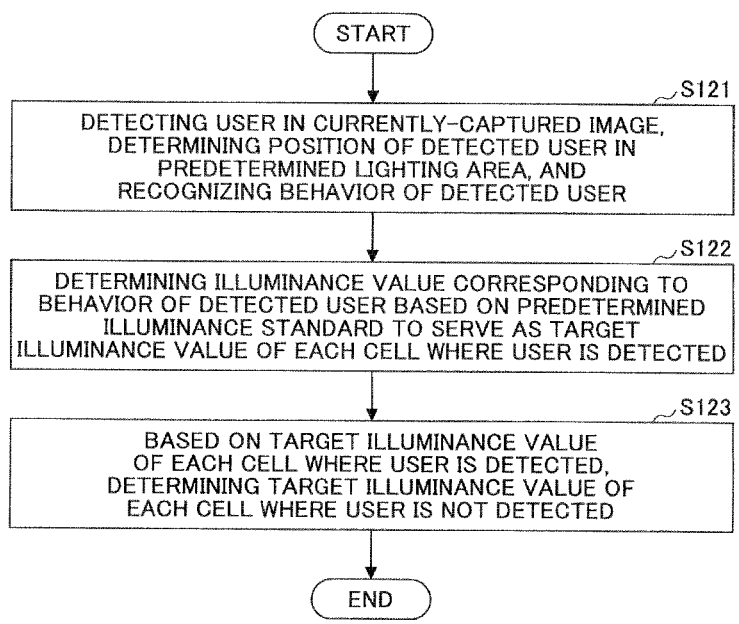
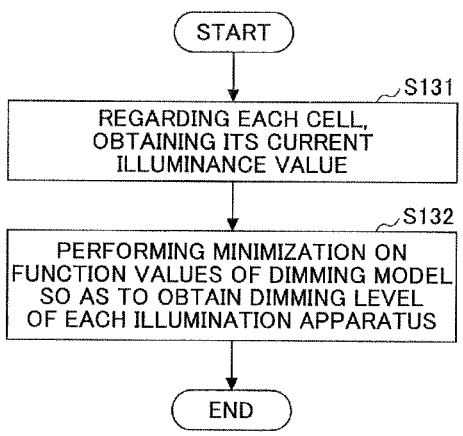

FIG.5

INTELLIGENT ILLUMINATION CONTROL METHOD, APPARATUS, AND SYSTEM

BACKGROUND OF THE INVENTION

1. Field of the Invention

The present invention generally relates to illumination control, and more particularly relates to a centrally-controlled intelligent illumination control method, apparatus, and system.

2. Description of the Related Art

In general, a conventional Building Automation System (BAS) includes a subsystem such as an integrated wiring subsystem, a computer-based network subsystem, a security subsystem, a fire control subsystem, and a closed circuit television-based monitoring subsystem. Recently, as economic and technological development matures, the energy conservation of illumination apparatuses and the intelligent management of the illumination apparatuses able to meet the requirements of users have attracted attention. As a result, the illumination control has become more and more important in the field of Building Automation Systems in recent years.

A typical illumination control system includes plural illumination apparatuses, plural illuminance (hereinafter, also called an "illuminance value") sensors, a central controller, and a communications network. In this kind of illumination control system, when one of the illumination apparatuses emits light according to a dimming level, the corresponding illuminance sensor detects the illuminance value in an area (hereinafter, also called a "lighting area") where the corresponding illuminance sensor is set and is able to sense the light, then the corresponding illuminance sensor sends the detected illuminance value to the central controller via the communications network, and then the central controller adjusts, on the basis of the difference between the detected illuminance value and a target illuminance value, the dimming level of the corresponding illumination apparatus.

For example, in a paper entitled "Modelling and Simulation of a Lighting Control System" and published in 2011 by Ghent University (Belgium), an illumination control system is disclosed in which a PID controller is utilized for adjusting illuminance. This system may achieve a good illumination control effect under a standard condition. However, when this system is used under a non-standard condition, the response of this system is relatively slow, and the illumination control effect is not good. Furthermore, in this system, it is necessary to adopt plural fixed illuminance sensors for measuring illuminance values. As a result, the number of apparatuses in this system is relatively large, thereby causing the manufacturing cost to be relatively high. Moreover, since the PID controller is designed on the basis of the plural fixed illuminance sensors, this system may only carry out illumination control with respect to fixed positions.

In a paper entitled "An Evolutionary Optimization Algorithm to Provide Individual Illuminance in Workplaces", written by Shingo Tanaka, et al. of Doshisha University (Japan), and published in 2009, an illumination control system is disclosed which is on the basis of a movable illuminance sensor. In this system, a distributed control algorithm is adopted. Furthermore, only when a current illuminance value is less than a target illuminance value, this system starts working. This may result in a stroboscopic problem. Moreover, since the movable illuminance sensor is adopted in this system for carrying out measurement, a user may feel inconvenienced when he wants to move this kind of illuminance sensor from a place to another place.

In addition, in Japanese Patent Application Publication No. 2009-238529, an illuminance control system is disclosed. In this system, a portable device is employed for measuring an illuminance value and for sending positional information, and a control device receives the positional information and controls, on the basis of the received positional information, a nearby illumination apparatus. However, this system may only control the on-off switching of the illumination apparatus; that is to say, this system may not adjust a dimming level of the illumination apparatus according to a desired dimming level (i.e., a target dimming level). Moreover, since this system utilizes the portable device for measuring the illuminance value, a user may also feel inconvenienced when he wants to move this kind of device from a place to another place.

Therefore, it is necessary to provide an illumination control system in which an illuminance sensor is not necessary, and by using this kind of illumination control system, it is possible to carry out intelligent illumination control with respect to a predetermined lighting area so as to be able to satisfy the requirements of users, to decrease the energy consumption, and to reduce the manufacturing cost.

SUMMARY OF THE INVENTION

According to one aspect of the present invention, an intelligent illumination control method is provided. The method includes a step of obtaining at least one image of a predetermined lighting area captured by at least one stereo camera; a step of determining, based on the at least one image, one or more target illuminance values of the predetermined lighting area; and a step of determining, based on the one or more target illuminance values, a dimming level of at least one illumination apparatus so that the at least one illumination apparatus illuminates according to the determined dimming level.

According to another aspect of the present invention, an intelligent illumination control apparatus is provided. The apparatus includes an image obtention part configured to obtain at least one image of a predetermined lighting area captured by at least one stereo camera; a target illuminance value determination part configured to determine, based on the at least one image, one or more target illuminance values of the predetermined lighting area; and a dimming level determination part configured to determine, based on the one or more target illuminance values, a dimming level of at least one illumination apparatus so that the at least one illumination apparatus illuminates according to the determined dimming level.

According to still another aspect of the present invention. An intelligent illumination control system is provided. The system includes at least one stereo camera configured to capture at least one image of a predetermined lighting area; a central illumination control apparatus configured to determine, based on the at least one image, one or more target illuminance values of the predetermined lighting area, and to determine, based on the determined one or more target illuminance values, a dimming level of at least one illumination apparatus; and a transmission apparatus configured to transmit the determined dimming level to the at least one illumination apparatus so that the at least one illumination apparatus illuminates according to the determined dimming level.

In the intelligent illumination control method, apparatus, and system according to the embodiments of the present invention, it is not necessary to use an illuminance sensor. In other words, instead of the illuminance sensor, at least one stereo camera is utilized for detecting (or determining) the position of at least one user located in a predetermined lighting area and for recognizing the behavior of the at least one user. In this way, it is possible to adjust, by carrying out centrally-controlled automation, a dimming level of at least one illumination apparatus illuminating (i.e., emitting light to) the predetermined lighting area, so that the illumination may be suitable to the behavior of the at least one user. As a result, it is easy to achieve intelligent illumination control, and it is possible to reduce the manufacturing cost, to meet the requirements of users, and to improve the work efficiency.

BRIEF DESCRIPTION OF THE DRAWINGS

FIG. 1 is a flowchart of an intelligent illumination control method in which an illuminance sensor is not utilized, according to a first embodiment of the present invention;

FIG. 2A illustrates an example of an illuminance value database;

FIG. 2B illustrates a relationship between dimming levels of an illumination apparatus and illuminance values in different cells (i.e., grids) of a predetermined lighting area, generated by the same illumination apparatus according to the dimming levels, respectively;

FIG. 2C illustrates a table in which a slope (i.e., gradient) of each line segment is used to express an illuminance value in each cell of a predetermined lighting area, generated by an illumination apparatus according to each dimming level;

FIG. 2D illustrates a relationship between a dimming level and an illuminance value;

FIG. 3 is a flowchart of a process of determining one or more target illuminance values on the basis of an image of a predetermined lighting area, according to the first embodiment of the present invention;

FIG. 4 is a flowchart of a process of determining a dimming level of an illumination apparatus on the basis of one or more target illuminance values, according to the first embodiment of the present invention;

FIG. 5 illustrates an example of setting weights for the respective cells of a predetermined lighting area;

DETAILED DESCRIPTION OF THE PREFERRED EMBODIMENTS

Figure 6:
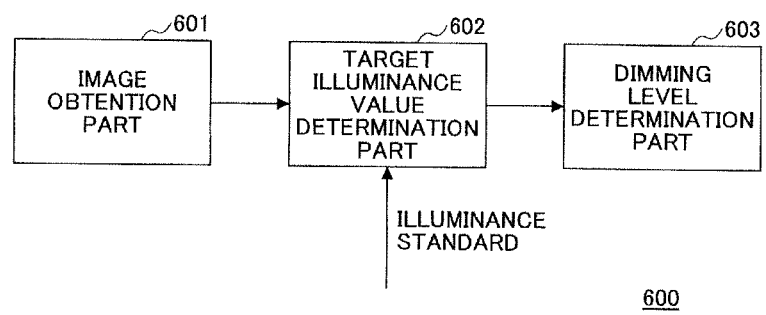
FIG. 6 is a block diagram illustrating an intelligent illumination control apparatus according to a fourth embodiment of the present invention.

In order to let those people skilled in the art better understand the present invention, hereinafter the present invention will be concretely described on the basis of the drawings and various embodiments.

First Embodiment

The basic thought of this embodiment is automatically carrying out, on the basis of a behavior (such as reading or talking) of at least one user located in a predetermined lighting area, intelligent control with respect to at least one illumination apparatus illuminating (i.e., emitting light to) the predetermined lighting area, according to predetermined personal preferences of users or a generalized international or national standard. Since a stereo camera is well utilized in the Building Automation System, and because the coverage of the stereo camera is very wide, in this embodiment, such a stereo camera is used for capturing an image of the predetermined lighting area. On the basis of this, the position of the at least one user located in the predetermined lighting area may be detected (determined), and the behavior of the at least one user may be recognized.

In an intelligent illumination control method according to this embodiment, since at least one stereo camera which is well utilized in the Building Automation System is used for determining the position of at least one user located in a predetermined lighting area and is used for recognizing a behavior of the at least one user, and because it is not necessary to use an additional illuminance sensor, it is easy to achieve the intelligent illumination control method with a corresponding apparatus and a corresponding system, and it is possible to reduce the related manufacturing cost. Furthermore, by using plural stereo cameras for capturing images of the predetermined lighting area, it is possible to improve the accuracy of positional detection and to avoid incorrect detection due to an obstacle. Moreover, in this embodiment, since the centrally-controlled automation is utilized for achieving illumination which may be suitable to the behavior of the at least one user, it is possible to satisfy the personal preferences of users and to improve the efficiency of the intelligent illumination control method, apparatus, and system.

FIG. 1 is a flowchart of an intelligent illumination control method in which an illuminance sensor is not utilized, according to this embodiment.

As shown in FIG. 1, in STEP S11, at least one image of a predetermined lighting area captured by at least one stereo camera is obtained.

In general, a stereo camera is popularly used in the Building Automation System. In this embodiment, at least one stereo camera is utilized for capturing the at least one image of the predetermined lighting area according to a predetermined time interval. The captured image of the predetermined lighting area serves as the basic data by which the intelligent illumination control is carried out.

In STEP S12, one or more target illuminance values of the predetermined lighting area are determined on the basis of the obtained at least one image. In what follows, this step will be described in detail by referring to FIG. 3.

FIG. 3 is a flowchart of a process of determining one or more target illuminance values on the basis of an image, according to the first embodiment.

First, in STEP S121, a user is detected in a captured current image, then the position of the user in the predetermined lighting area is determined, and then a behavior of the user is recognized. In order to accurately determine the position of the user in the predetermined lighting area, in this embodiment, the predetermined lighting area is divided into, for example, N (N=x×y) cells (also called "grids"). In this way, the position of the user in the predetermined area is determined, i.e., a cell (or plural cells) in which the user is located is determined. This step relates to image processing. Here it should be noted that it is possible to adopt any conventional technique to carry out the image detection and the user recognition. As a result, the descriptions related to the image detection and the user recognition are omitted here.

Second, in STEP S122, on the basis of a predetermined illuminance standard, an illuminance value corresponding to the behavior of the user is determined, and the determined illuminance value serves as the target illuminance value of the detected cell(s) in which the user is located.

Here it should be noted that the predetermined illuminance standard may be an international or national illuminance standard, or may be an illuminance standard predetermined by the user on the basis of personal preference of the users. This kind of illuminance standard may be represented as an illuminance value database. Regarding the detected cell(s) in which the user is located, an illuminance value (for example, according to a national standard, an illuminance vale "300 Lx" is suitable for reading) corresponding to the behavior of the user is obtained from the predetermined standard (for example, an illuminance value database) to serve as the target illuminance value of the detected cell(s). In this way, by adjusting the dimming level of a corresponding illumination apparatus on the basis of the target illuminance value, it is possible to let the illuminance value of the detected cell(s) be a desired one (i.e., the target illuminance value).

Finally, in STEP S123, on the basis of the target illuminance value of the detected cell(s) in which the user is located, a target illuminance value of each cell in which the user is not detected is determined.

In N cells of the predetermined lighting area, the user may be located in only a few cells; that is to say, the user may be detected in only a few cells. Regarding cells in which the user is not detected, it is possible to determine, according to predetermined various approaches, their target illuminance values on the basis of the target illuminance values of the detected cell(s) in which the user is located. For example, it is possible to adopt an approach, namely, if it is assumed that a cell A is a detected cell in which the user is located, then regarding the surrounding cells in which the user is not detected, their target illuminance values linearly decrease as the distances between the cell A and the surrounding cells increase.

Referring to FIG. 1 again. In STEP S13, on the basis of the one or more target illuminance values, the dimming level of at least one illumination apparatus is determined so that the at least one illumination apparatus operates (i.e., illuminates) according to the determined dimming level.

Here it should be noted that it is possible to adopt, in response to the requirements of users, various proper approaches to determine the dimming level of the at least one illumination apparatus on the basis of the one or more target illuminance values. In this embodiment, a central control method is adopted for determining the dimming level of the at least one illumination apparatus so as to obtain a better quality of illumination. In what follows, the central control method will be described in detail.

First, the relationship between dimming levels of at least one illumination apparatus and corresponding illuminance values is described as follows.

As described above, in this embodiment, the predetermined lighting area is divided into N (N=x×y) cells. Each cell may be illuminated by one or plural illumination apparatuses; as a result, the illuminance value of the corresponding cell should be the sum of the illuminance values generated at the corresponding cell by the respective illumination apparatuses. For example, as for a given cell j (j=1, 2, . . . , N), its illuminance value may be expressed as the following equation (1).

$$E_j = \sum_{i=1}^{m} h_j^{(i)} D_i + g_0 \quad (1)$$

Here i refers to an illumination apparatus number (i=1, 2, . . . , m); $D_i$ refers to a dimming level of the i-th illumination apparatus; $h_j^{(i)}$ refers to a function (i.e. a relationship) between dimming levels of the i-th illumination apparatus and corresponding illuminance values generated at the j-th cell according to the dimming levels; and $g_0$ refers to a basic illuminance value when the respective illumination apparatuses are turned off. As for $h_j^{(i)}$, it may be determined in advance according to various approaches. For example, it is possible to set an illuminance sensor in the j-th cell so as to collect illuminance values corresponding to the dimming levels of the i-th illumination apparatus, and then, by carrying out fitting with respect to the collected illuminance values, it is possible to obtain $h_j^{(i)}$.

By utilizing the above equation (1), it is possible to calculate the illuminance value of each cell, and then, it is possible to build an illuminance value database for storing the calculated illuminance values in response to the requirements of users.

FIG. 2A illustrates an example of an illuminance value database.

As shown in FIG. 2A, in this database, a table for each illumination apparatus is built in which dimming levels of the corresponding illumination apparatus and illuminance values of the respective cells of a predetermined lighting area are correspondingly stored. In the tables, $D_i^{(L)}$ refers to the L-th (L=1, 2, . . . , k) dimming level of the i-th illumination apparatus. Here it should be noted that the data in the database shown in FIG. 2A may also be represented as shown in FIG. 2B.

FIG. 2B illustrates a relationship between dimming levels of an illumination apparatus D1 and illuminance values in different cells of a predetermined lighting area, generated by the same illumination apparatus according to the dimming levels, respectively.

As shown in FIG. 2B, the horizontal axis refers to the dimming levels, and the vertical axis refers to the corresponding illuminance values. When the illumination apparatus D1 illuminates according to dimming levels 10%, 50%, and 100%, three corresponding illuminance values generated at a cell (for example, R1) nearest the illumination apparatus D1 on the basis of the three dimming levels are maximum, whereas three corresponding illuminance values generated at a cell (for example, R4) farthest from the illumination apparatus D1 on the basis of the three dimming levels are minimum. In other words, the smaller the distance between an illumination apparatus and a cell is, the larger the corresponding illuminance value of the cell is, and the larger the distance between an illumination apparatus and a cell is, the smaller the corresponding illuminance value of the cell is.

Here it should be noted that it is also possible to carry out piecewise linearization with respect to each curve shown in FIG. 2B. In this way, as shown in FIG. 2D, it is possible to use a slope (i.e., gradient) of each line segment for expressing an illuminance value generated at each cell of the predetermined lighting area by an illumination apparatus according to each dimming level. Furthermore, FIG. 2C illustrates a table in which a slope of each line segment is used for expressing an illuminance value of each cell in a predetermined lighting area, generated by an illumination apparatus (for example, the illumination apparatus D1) according to each dimming level. As shown in FIG. 2C, the horizontal header of the table refers to the respective dimming levels of the illumination apparatus D1. Each item of the table refers to a slope of a point on an illuminance function curve, corresponding to each dimming level.

Up to here, the basic concepts and thoughts related to the intelligent illumination control method according to this embodiment have been introduced. In what follows, the above mentioned STEP S13 will be described in detail by referring to FIG. 4.

FIG. 4 is a flowchart of a process of determining a dimming level of at least one illumination apparatus on the basis of one or more target illuminance values, according to this embodiment.

As shown in FIG. 4, in STEP S131, as for each cell of a predetermined lighting area, a current illuminance value of the corresponding cell is obtained.

As described above, the current illuminance value of the corresponding cell may be calculated by adopting the above equation (1).

Next, in STEP S132, a minimization process is carried out with respect to function values of a dimming model so as to obtain a dimming level of each illumination apparatus. The dimming model expresses the sum of the illuminance differences of the respective cells of a predetermined lighting area, wherein, each of the illuminance differences indicates the difference between a target illuminance value of the corresponding cell and an actual illuminance value of the corresponding cell after carrying out dimming. Here it should be noted that the actual illuminance value of each cell is the sum of a current illuminance value of the corresponding cell and a to-be-actually-adjusted illuminance adjustment step length (i.e., illuminance adjustment amount) of the corresponding cell.

The dimming model may be built in response to the requirements of users so that a dimming level calculated on the basis of this dimming model may better satisfy personal preferences of users. In this embodiment, for example, the dimming model is built by using a constraint condition, namely, the sum of the illuminance differences of all the cells of the predetermined lighting area is minimum. Here each of the illuminance differences indicates the difference between a target illuminance value of the corresponding cell and an actual illuminance value of the corresponding cell after carrying out dimming. In this way, it is possible to accurately obtain a desired illuminance value. On the basis of the above constraint condition, it is possible to adopt, for example, the least square method or regression analysis to build the dimming model. For example, when the least square method is adopted, the dimming model may be expressed as the following target function.

$$\min \sum_{j=1}^{N} [E'_j - \overline{E}_j]^2 \quad (2)$$

Here j (j=1, 2, . . . , N) refers to a cell in a predetermined lighting area; $E'_j$ refers to an actual illuminance value of the j-th cell after carrying out dimming; and $\overline{E}_j$ refers to a target illuminance value of the j-th cell.

If $E_j$ is a current illuminance value, then on the basis of equation (1) above, it is possible to obtain the following equation (3).

$$E'_j = E_j + \Delta E_j = E_j + \Delta \left( \sum_{i=1}^{m} h_j^{(i)} D_i + g_0 \right) = \quad (3)$$

-continued $$E_j + \sum_{i=1}^{m} \Delta h_j^{(i)} \delta_{D_i} = E_j + \left[ \frac{dE_j^{(1)}}{dD_1} \frac{dE_j^{(2)}}{dD_2} \cdots \frac{dE_j^{(m)}}{dD_m} \right] \begin{bmatrix} \delta_{D_1} \\ \delta_{D_3} \\ \vdots \\ \delta_{D_m} \end{bmatrix}$$

Here $$\left. \frac{dE_j^{(1)}}{dD_1} \right|_{D_i} = \frac{h_j^{(i)}(D_i^L + \delta_{D_i}) - h_j^{(i)}(D_i^L)}{\delta_{D_i}} = \frac{h_j^{(i)}(D_i^{L+1}) - h_j^{(i)}(D_i^L)}{D_i^{L+1} - D_i^L}.$$

It is obvious that in the above equation (3), $$\frac{dE_j^{(i)}}{dD_i}$$

is just the slope of each line segment in the table shown in FIG. 2C.

By substituting the above equation (3) into the above equation (2), the target function may be expressed as the following.

$$\min \sum_{j=1}^{N} \left[ E_j - \overline{E}_j + \left[ \frac{dE_j^{(1)}}{dD_1} \frac{dE_j^{(2)}}{dD_2} \cdots \frac{dE_j^{(m)}}{dD_m} \right] \begin{bmatrix} \delta_{D_1} \\ \delta_{D_2} \\ \vdots \\ \delta_{D_m} \end{bmatrix} \right]^2 + \quad (4)$$

$$\alpha \left( \sum_{i=1}^{m} (D_i + \delta_{D_i}) p_i \right)^2$$

and $$0 \le D_i + \delta_{D_i} \le 1$$

By utilizing the Lagrangian multiplier method or any other proper conventional method, it is possible to obtain the result, i.e., $$\begin{bmatrix} \delta_{D_1} \\ \delta_{D_2} \\ \vdots \\ \delta_{D_m} \end{bmatrix}$$

of the above target function (4), namely, the adjustment amount of each illumination apparatus. In this way, it is possible to acquire the dimming level of each illumination apparatus.

As described above, the dimming model is built in response to the requirements of users. In the above description, the dimming model is built by using a constraint condition, namely, the sum of the illuminance differences of all the cells of the predetermined lighting area is minimum, wherein, each of the illuminance differences indicates the difference between a target illuminance value of the corresponding cell and an actual illuminance value of the corresponding cell after dimming. However, it should be noted that this is just an example; in other words, the present invention is not limited to this. In response to the requirements of users, it is possible to make a suitable adjustment accordingly.

For example, a user may not only hope to obtain a desired illuminance value but may also care about the total amount of electric energy consumption. At this time, the dimming model may be expressed as the following target function.

$$\min \sum_{j=1}^{N} \left[ E_j - \overline{E}_j + \left[ \frac{dE_j^{(1)}}{dD_1} \quad \frac{dE_j^{(2)}}{dD_2} \quad \cdots \quad \frac{dE_j^{(M)}}{dD_m} \right] \begin{bmatrix} \delta_{D_1} \\ \delta_{D_2} \\ \vdots \\ \delta_{D_m} \end{bmatrix} \right]^2 + \quad (5)$$

$$\alpha \left( \sum_{i=1}^{m} (D_i + \delta_{D_i}) p_i \right)^2$$

and $$0 \le D_i + \delta_{D_i} \le 1$$

Here $P_i$ refers to a rated voltage of the i-th illumination apparatus, and a refers to a relative weight of consumed amount of electricity and an illuminance difference which is one between a target illuminance value and an actual illuminance value. The more a user cares about the consumed amount of electricity, the larger the value of $\alpha$ is, and the less a user cares about the consumed amount of electricity, the smaller the value of $\alpha$ is. In addition, in general, a dimming level of an illumination apparatus may only be adjusted between a minimum dimming level, i.e., 0% (when being turned off) and a maximum dimming level, i.e., 100%; as a result, $0 \le D_i + \delta_{D_i} \le 1$.

Again, for example, aside from the above concerns, a user may also hope to avoid a stroboscopic problem when an illuminance value changes. At this time, the dimming model may be expressed as the following target function.

$$\min \sum_{j=1}^{N} \left[ E_j - \overline{E}_j + \left[ \frac{dE_j^{(1)}}{dD_1} \quad \frac{dE_j^{(2)}}{dD_2} \quad \cdots \quad \frac{dE_j^{(M)}}{dD_M} \right] \begin{bmatrix} \delta_{D_1} \\ \delta_{D_2} \\ \vdots \\ \delta_{D_m} \end{bmatrix} \right]^2 + \quad (6)$$

$$\alpha \left( \sum_{i=1}^{m} (D_i + \delta_{D_i}) p_i \right)^2 + \beta \left\| \begin{bmatrix} \delta_{D_1} \\ \delta_{D_2} \\ \vdots \\ \delta_{D_m} \end{bmatrix} \right\|^2$$

and $$0 \le D_i + \delta_{D_i} \le 1$$

Here $$\begin{bmatrix} \delta_{D_1} \\ \delta_{D_2} \\ \vdots \\ \delta_{D_m} \end{bmatrix}$$

refers to an adjustment step length (i.e., adjustment amount) of each illumination apparatus, and β refers to a relative weight of the adjustment step length and the difference between a target illuminance value and a corresponding actual illuminance value. The more a user cares about the stroboscopic problem, the larger the value of β is, and the less a user cares about the stroboscopic problem, the smaller the value of β is.

Second Embodiment

An intelligent illumination control method according to this embodiment is basically the same as the intelligent illumination control method according to the first embodiment. The difference between the two is that in this embodiment, a weight is set for each cell of a predetermined lighting area so as to further improve the difference between a target illuminance value of the corresponding cell and an actual illuminance value of the corresponding cell after adjusting the dimming level of a corresponding illumination apparatus.

In the first embodiment, it is assumed that the levels of importance of the illumination control for respective cells of a predetermined lighting area are the same. However, actually, the accuracy requirements of the illumination control for the respective cells of the predetermined lighting area are different. For example, the difference between a target illuminance value and a corresponding actual illuminance value of a cell in which a user is detected should be less than the difference between a target illuminance value and a corresponding actual illuminance value of a cell in which a user is not detected. That is to say, the illuminance adjustment accuracy of a cell in which a user is detected should be higher than that of a cell in which a user is not detected. Furthermore, the accuracy requirement of illuminance adjustment of a cell in which a user is detected may be higher that of another cell in which a user is detected too. In response to these kinds of circumstances, in this embodiment, different weights are set for the respective cells of the predetermined lighting area. Actually, it is possible to set, on the basis of the levels of importance of users in the respective cells of the predetermined lighting area, different weights for the respective cells. For example, the higher the level of importance of a user is, the larger the weight of a corresponding cell in which the user is located is.

Figure 5:
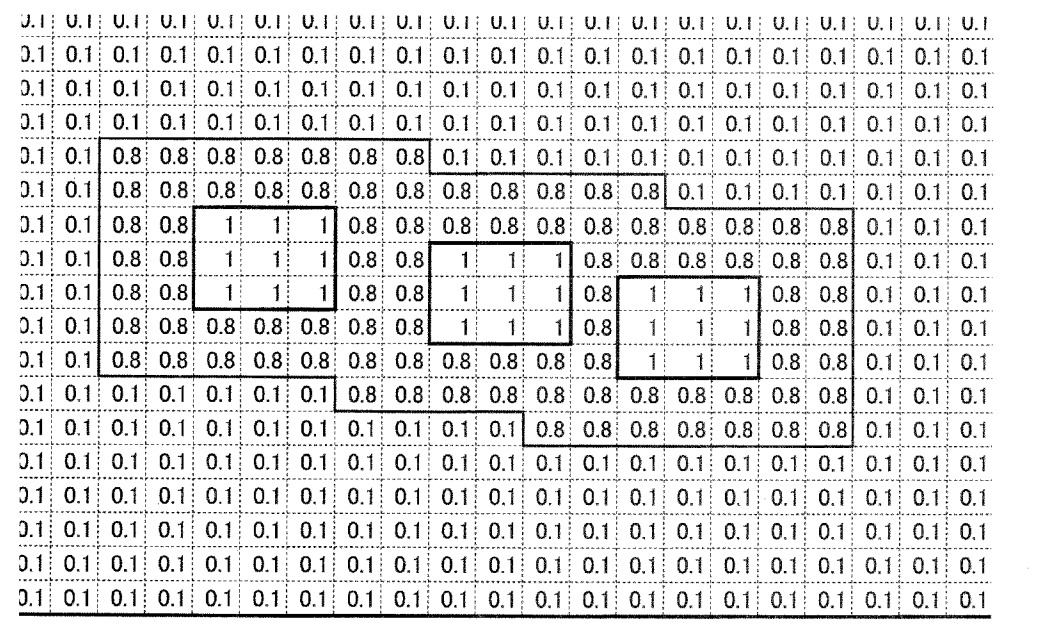

FIG. 5 illustrates an example of setting weights for the respective cells of a predetermined lighting area.

As shown in FIG. 5, as for a cell in which a user having a higher level of importance is detected, weights of respective cells being in a first region whose center is the cell (in which the user is detected) and whose size is 0.4 m×0.4 m are set to 1; weights of respective cells being in a second region whose center is the cell (in which the user is detected) and whose size is 0.8 m×0.8 m and not being in the first region are set to 0.8; and weights of respective cells being outside the second region are set to 0.1. Here it should be noted that in FIG. 5, there are three the first regions and three the second regions. Furthermore, what FIG. 5 shows is just an example, and is not used for limiting the present invention. For example, the size of the first or second region as well as the weights set for the cells in the two regions may be other proper values.

In what follows, the difference between the two intelligent illumination control methods according to the first and second embodiments will be described in detail.

First, in the intelligent illumination control method according to this embodiment (i.e., the second embodiment), after STEP S121 (shown in FIG. 3) (i.e., after a user is detected in an image obtained currently, then the position of the user in the predetermined lighting area is determined, and then a behavior of the user is recognized), the level of importance of the user is further determined, and then, on the basis of the determined level of importance of the user, weights are set for cells in which the user is located and other cells in which the user is not located. In this way, in the follow-on STEP S123 in which a minimization process is carried out with respect to function values of a dimming model so as to obtain a dimming level of each illumination apparatus, when building the dimming model, the set weights of the respective cells are considered. That is to say, the dimming model is built by using a constraint condition, namely, the sum of the illuminance differences respectively multiplied by the weights is minimum, wherein, each of the illuminance differences indicates the difference between a target illuminance value of the corresponding cell and an actual illuminance value of the corresponding cell after adjusting the dimming level of the illumination apparatus. For example, the above target function (4) may further be optimized as the following target function.

$$\min \sum_{j=1}^{N} \left[ w_j \left( E_j - \overline{E}_j + \left[ \frac{dE_j^{(1)}}{dD_1} \quad \frac{dE_j^{(2)}}{dD_2} \quad \cdots \quad \frac{dE_j^{(M)}}{dD_M} \right] \begin{bmatrix} \delta_{D_1} \\ \delta_{D_2} \\ \vdots \\ \delta_{D_m} \end{bmatrix} \right) \right]^2 \quad (7)$$

Here $w_j$ refers to a weight set for the j-th cell of the predetermined lighting area.

According to this embodiment, the higher the level of importance of a user is, the larger of the weight set for a corresponding cell in which the user is located is. As a result, as for a cell having a higher weight, the difference between its target illuminance value and its actual illuminance value is relatively small, i.e., the illumination control is relatively accurate. In this way, the intelligent illumination control method according to this embodiment may better satisfy the requirements of users.

Third Embodiment

In the intelligent illumination control method (hereinafter, called the "control method" or "illumination control method" sometimes) described in the first or second embodiment, a condition for triggering the control method is not limited. As a result, the control method can be triggered by adopting any proper means. For example, the control method can be triggered every predetermined time interval, can be triggered every time when a stereo camera captures an image, or can be triggered every time when a user is detected in an image captured by a stereo camera. However, actually, there is still a disadvantage. For example, in a case where the control method is triggered every predetermined time interval, if the predetermined time interval is too long, then since a user behavior may change a few times during the predetermined time interval, the control method cannot timely and automatically adjust the illuminance values of a predetermined lighting area as the user's behavior changes; if the predetermined time interval is too short, then since the user's behavior may not change during the predetermined time interval, it is no use to carry out the control method, and the cost related to the illumination control may be increased. Furthermore, in a case where the control method is triggered every time when a user is detected in an image captured by a stereo camera, the disadvantage is similar to that in the case where the control method is triggered every predetermined time interval and the predetermined time interval is too short, as described above.

Taking into account the above circumstances, in this embodiment (i.e., the third embodiment), an optimal strategy is adopted for triggering the control method. In what follows, the optimal strategy will be described on the basis of the difference between the control method according to this embodiment and the control method according to the embodiment above.

In particular, in the control method according to this embodiment, in STEP S13 (shown in FIG. 1) (i.e., a dimming level of each illumination apparatus is determined on the basis of one or more target illuminance values), first, a currently captured image is compared with an image captured at a previous time point. Only when it is determined that there is a difference between a behavior of at least one user in the currently captured image and a behavior of the same user in the image captured at the previous time point, STEPS S131 and S132 are carried out. In other words, STEPS S131 and S132 are carried out only when it is determined that the number of users detected in the currently captured image is greater than the number of users detected in the image captured at the previous time point (for example, at least one new user entered the predetermined lighting area), the number of users detected in the currently captured image is less than the number of users detected in the image captured at the previous time point (i.e., at least one existing user departed from the predetermined lighting area), or although the number of users detected in the currently captured image is equal to the number of users detected in the image captured at the previous time point, a behavior of at least one user detected in the currently captured image is different from a behavior of the same user detected in the image captured at the previous time point. In this way, it is possible to timely and automatically adjust the illuminance values of the predetermined lighting area as the behavior of at least one user changes. At the same time, since the illumination control is conducted only when a behavior of at least one user changes, it is possible to avoid a problem like that in the case where the control method is triggered every predetermined time interval and the predetermined time interval is too short, as described above.

<Variations>

Up to here, the intelligent illumination control method according to each embodiment has been described in detail. In what follows, a few variations will be described concretely.

<Variation 1>

In the above embodiments, when building the illuminance model, not only the illuminance difference of each cell in which a user is detected but also the illuminance difference of each cell in which a user is not detected are considered (here it should be noted that the definition of the illuminance difference is the same as described above). However, actually, since the influence caused by the illuminance difference of each cell in which a user is not detected is not big, as a simplified intelligent illumination control method, it is possible to only consider the illuminance difference of each cell in which a user is detected, i.e., it is possible not to consider the illuminance difference of each cell in which a user is not detected.

A first achievement approach is a special case of the second embodiment. In particular, in the illumination control method according to the second embodiment, when setting weights for the respective cells of the predetermined lighting area, the weight of each cell in which a user is not detected is set as 0. In this way, when solving the above target function (7), the illuminance difference of each cell in which a user is not detected may be any value. In other words, it is okay to only consider the illuminance difference of each cell in which a user is detected. As a result, it is possible to reduce the calculation complexity.

A second achievement approach is omitting STEP S123 (shown in FIG. 3). In other words, in STEP S12 (shown in FIG. 1), only a target illuminance value of each cell in which a user is detected is determined, i.e., a target illuminance value of each cell in which a user is not detected is not determined. Accordingly, in the follow-on STEP S132 (shown in FIG. 4), a dimming model is built by using a constraint condition, namely, the sum of the illuminance difference of each cell in which a user is detected is minimum. In this way, it is possible not only to decrease the calculation amount but also to reduce the calculation complexity.

<Variation 2>

In the second embodiment, the optimal strategy is adopted for triggering the intelligent illumination control method so that the illuminance values of the predetermined lighting area may be timely and automatically adjusted as a behavior of at least one user detected in the predetermined lighting area changes, and the intelligent illumination control method can be conducted meaningfully. However, when the optimal strategy is adopted, there is still a problem. In particular, in a case where a user in the predetermined lighting area frequently does a short-time movement behavior such as going to make a phone call or going to drink a cup of coffee, if the optimal strategy is adopted for triggering the intelligent illumination control method, the illuminance values of the predetermined lighting area may be changed frequently. However, frequently changing the illuminance values of the predetermined lighting area may distract a user's attention. As a result, as for a behavior like the above short-time movement behavior, it is not necessary to change the illuminance values of the predetermined lighting area. This kind of problem may be solved by adopting the following two approaches.

A first approach is further optimizing the trigger strategy, namely, only when a behavior of a user is changed to a behavior of interest such as reading something, talking with each other, or listening to a lecture, the illumination control is conducted. In particular, in the illumination control method adopting this optimized trigger strategy, in STEP S13 (shown in FIG. 1) in which a dimming level of each illumination apparatus is determined on the basis of one or more target illuminance values, a currently captured image is compared with an image captured at a previous time point. Only when it is determined that a behavior of a user detected in the currently captured image is different from a behavior of the same user detected in the image captured at the previous time point, and the behavior in the currently captured image is, for example, the behavior of interest, STEPS S131 and S132 are carried out. Here it should be noted the above-described interested behavior may be determined in advance in response to the requirements of users.

A second approach is adopting fade-in fade-out to change the illuminance values of the predetermined lighting area. This approach may be applied to the illumination control method described in each of the above embodiments. In particular, after a dimming level of each illumination apparatus is determined on the basis of one or more target illuminance values, the corresponding illumination apparatus do not change its dimming level at once. Instead, the corresponding illumination apparatus utilizes a fade-in fade-out way (for example, a fade rate of 1 minute) to change its dimming level so that a user may not notice the instantaneous change of illuminance.

<Variation 3>

The illuminance value database as shown in FIG. 2A and the slope data table as shown in FIG. 2C may be calculated before carrying out the illumination control method, and may be stored in a memory device in advance. In this way, when carrying out the illumination control method, it is possible to directly read the related data from the memory device so that it is possible to reduce the calculation time so as to improve efficiency.

<Variation 4>

In the illumination control method according to each of the above embodiments, if a user is not detected in an image of a predetermined lighting area captured by a stereo camera, i.e., if there isn't a user in the predetermined lighting area, then it is possible to turn off each illumination apparatus so as to save electric energy.

Embodiment 4

FIG. 6 is a block diagram illustrating an intelligent illumination control apparatus according to a fourth embodiment of the present invention.

As shown in FIG. 6, an intelligent illumination apparatus 600 includes an image obtention part 601 configured to obtain at least one image of a predetermined lighting area capture by at least one stereo camera; a target illuminance value determination part 602 configured to determine, based on the at least one image, one or more target illuminance values of the predetermined lighting area; and a dimming level determination part 603 configured to determine, based on the one or more target illuminance values, a dimming level of at least one illumination apparatus so that the at least one illumination apparatus works (i.e., illuminates) according to the determined dimming level.

Here it should be noted that since the processes of the image obtention part 601, the target illuminance value determination part 602, and the dimming level determination part 603 are the same as the processes of the corresponding steps of each of the intelligent illumination control methods described in the above embodiments, the related description is omitted here.

Embodiment 5

Figure 7:
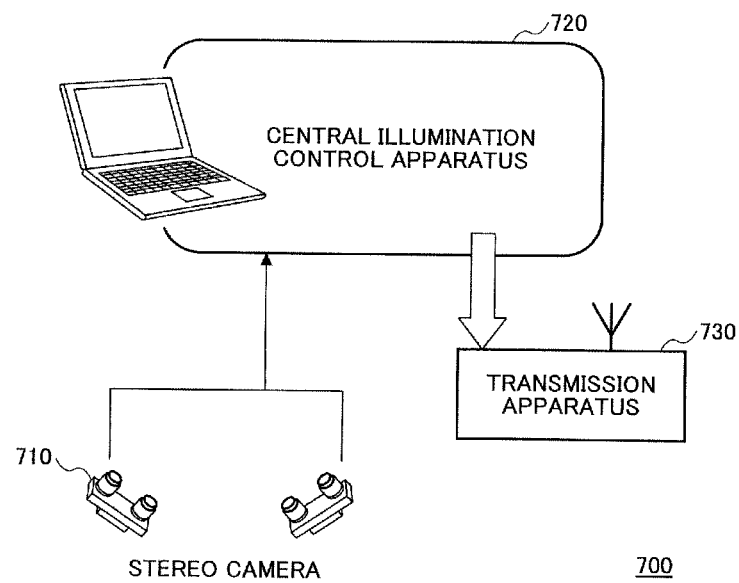
FIG. 7 is a drawing illustrating an intelligent illumination control system according to a fifth embodiment of the present invention.

FIG. 7 is a drawing illustrating an intelligent illumination control system according to a fifth embodiment of the present invention.

As shown in FIG. 7, a control system 700 includes a stereo camera 710 configured to capture at least one image of a predetermined lighting area; a central illumination control apparatus 720 configured to carry out the intelligent illumination control method according to any one of the Embodiments 1 to 3, or configured to serve as the intelligent illumination apparatus according the Embodiment 4, wherein, the central illumination apparatus may be achieved by adopting, for example, a central processor unit of a computer or a chip having the same processing ability; and a transmission apparatus 730 configured to transmit a determined dimming level to at least one illumination apparatus so that each illumination apparatus illuminates (i.e., emits light) according to determined dimming level, wherein, the transmission apparatus may be achieved by utilizing various conventional wired or wireless transmitters.

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201310166139.9 filed on May 8, 2013, the entire contents of which are hereby incorporated by reference.

What is claimed is:

1. An intelligent illumination control method, comprising:
a step of obtaining at least one image of a predetermined lighting area captured by at least one stereo camera and divided into plural cells;
a step of determining, based on the at least one image of the predetermined lighting area, one or more target illuminance values of the predetermined lighting area;
a step of determining, based on the one or more target illuminance values of the predetermined lighting area and a dimming model, a dimming level of at least one illumination apparatus so that the at least one illumination apparatus illuminates according to the determined dimming level; and
a step of obtaining, for each cell amongst the plural cells of the predetermined lighting area, a current illuminance value of the cell, wherein
in the dimming model, for each cell amongst the plural cells of the predetermined lighting area, a weight is set for the cell, and wherein
the dimming model represents a sum of illuminance differences of each cell in the predetermined lighting area multiplied by the weight of the corresponding cell, and
each of the illuminance differences is a difference between a target illuminance value of the corresponding cell and an actual illuminance value of the corresponding cell after carrying out dimming, and the actual illuminance value of the corresponding cell is a sum of the current illuminance value of the corresponding cell and a to-be-actually-adjusted illuminance adjustment step length.

2. The intelligent illumination control method according to claim 1, wherein the step of determining one or more target illuminance values based on at least one image of the predetermined lighting area comprising:
a step of detecting at least one user in the at least one image;
a step of detecting one or more cells in which the at least one user is located in;
a step of recognizing a behavior of the at least one user; and
a step of determining, based on a predetermined illuminance standard, an illuminance value corresponding to the behavior of the at least one user to serve as the target illuminance values of the one or more cells in which the at least one user is located in.

3. The intelligent illumination control method according to claim 2, wherein, the step of determining the one or more target illuminance values based on the at least one image of the predetermined lighting area comprising:
a step of determining, based on the one or more target illuminance values of the one or more cells in which the at least one user is located in, one or more target illuminance values of one or more cells in which the user is not detected.

4. The intelligent illumination control method according to claim 3, wherein, the step of determining a dimming level of at least one illumination apparatus based on the one or more target illuminance value of the predetermined lighting area comprising:
a step of carrying out a minimization process with respect to function values of the dimming model so as to obtain the dimming level of the at least one illumination apparatus.

5. The intelligent illumination control method according to claim 4, wherein:
the dimming model also represents total amount of electric energy consumed in the predetermined lighting area.

6. The intelligent illumination control method according to claim 5, wherein:
the dimming model also represents an adjustment step length of a dimming level.

7. The intelligent illumination control method according to claim 3, wherein, the at least one stereo camera captures the at least one image of the predetermined lighting area according to a predetermined time interval, and the step of determining a dimming level of at least one illumination apparatus based on one or more target illuminance values of the predetermined lighting area comprising:
in a case where a behavior of at least one user in a currently-captured image is different from a behavior of the same user in an image captured at a previous time point, as for each cell of the predetermined lighting area, obtaining a current illuminance value of the corresponding cell; and carrying out a minimization process with respect to function values of a dimming level so as to obtain the dimming level of the at least one illumination apparatus.

8. An intelligent illumination control apparatus comprising:
- an image obtention part configured to obtain at least one image of a predetermined lighting area captured by at least one stereo camera, the predetermined lighting area being divided into plural cells;
- a target illuminance value determination part configured to determine, based on the at least one image, one or more target illuminance values of the predetermined lighting area; and
- a dimming level determination part configured to determine, based on the one or more target illuminance values and a dimming model, a dimming level of at least one illumination apparatus so that the at least one illumination apparatus illuminates according to the determined dimming level and configured to obtain, for each cell amongst the plural cells of the predetermined lighting area, a current illuminance value of the cell, wherein
- the dimming model represents a sum of illuminance differences of each cell in the predetermined lighting area, and
- each of the illuminance differences is a difference between a target illuminance value of the corresponding cell and an actual illuminance value of the corresponding cell after carrying out dimming, and the actual illuminance value of the corresponding cell is a sum of the current illuminance value of the corresponding cell and a to-be-actually-adjusted illuminance adjustment amount.

9. An intelligent illumination control system comprising:
- at least one stereo camera configured to capture at least one image of a predetermined lighting area which is divided into plural cells;
- a central illumination control apparatus configured to determine, based on the at least one image, one or more target illuminance values of the predetermined lighting area and to determine, based on the determined one or more target illuminance values and a dimming model, a dimming level of at least one illumination apparatus; and
- a transmission apparatus configured to transmit the determined dimming level to the at least one illumination apparatus so that the at least one illumination apparatus illuminates according to the determined dimming level and configured to obtain, for each cell amongst the plural cells of the predetermined lighting area, a current illuminance value of the cell, wherein
- the dimming model represents a sum of illuminance differences of each cell in the predetermined lighting area, and
- each of the illuminance differences is a difference between a target illuminance value of the corresponding cell and an actual illuminance value of the corresponding cell after carrying out dimming, and the actual illuminance value of the corresponding cell is a sum of the current illuminance value of the corresponding cell and a to-be-actually-adjusted illuminance adjustment amount.

* * * * *